United States Patent
Nambi

(10) Patent No.: US 11,267,137 B1
(45) Date of Patent: Mar. 8, 2022

(54) CONTROLLING END EFFECTOR SUCTION AREA USING EXPANDABLE BLADDER

(71) Applicant: Amazon Technologies, Inc., Seattle, WA (US)

(72) Inventor: Manikantan Nambi, Malden, MA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 16/694,586

(22) Filed: Nov. 25, 2019

(51) Int. Cl.
*B25J 15/06* (2006.01)
*B65G 47/91* (2006.01)
*B25J 15/00* (2006.01)
*B66C 1/02* (2006.01)
*B25B 11/00* (2006.01)

(52) U.S. Cl.
CPC ....... *B25J 15/0616* (2013.01); *B25J 15/0023* (2013.01); *B65G 47/91* (2013.01); *B25B 11/007* (2013.01); *B25J 15/0052* (2013.01); *B66C 1/0212* (2013.01); *B66C 1/0293* (2013.01)

(58) Field of Classification Search
CPC ............... B25J 15/0616; B25J 15/0683; B25J 15/0023; B25J 15/0052; B66C 1/0212; B66C 1/0231; B66C 1/0293; B25B 11/007; B65G 47/91
See application file for complete search history.

(56) References Cited

U.S. PATENT DOCUMENTS

| | | | |
|---|---|---|---|
| 2,929,653 A * | 3/1960 | Hund | B65B 21/12 294/119.3 |
| 3,734,325 A | 5/1973 | Stone | |
| 4,469,100 A * | 9/1984 | Hardwick | A61B 17/22032 604/908 |
| 5,344,202 A | 9/1994 | Ramler et al. | |
| 5,984,623 A | 11/1999 | Smith et al. | |
| 6,561,744 B2 | 5/2003 | Liang | |
| 8,251,415 B2 | 8/2012 | Lomerson, Jr. | |
| 8,525,955 B2 | 9/2013 | Long | |
| 9,457,477 B1 * | 10/2016 | Rublee | B25J 9/16 |
| 10,179,411 B2 * | 1/2019 | Lessing | B25J 15/0014 |
| 10,357,883 B1 * | 7/2019 | O'Connor | B25J 15/0683 |
| 2006/0043747 A1 | 3/2006 | Kniss | |
| 2009/0320417 A1 | 12/2009 | Gilmore | |
| 2012/0207574 A1 | 8/2012 | La Rovere et al. | |
| 2014/0037413 A1 | 2/2014 | Takashima et al. | |
| 2015/0375401 A1 | 12/2015 | Dunkmann et al. | |
| 2016/0214812 A1 | 7/2016 | Johnson | |
| 2019/0084012 A1 | 3/2019 | McCoy, Jr. et al. | |
| 2019/0217482 A1 * | 7/2019 | Ishida | B25J 15/0061 |
| 2019/0217487 A1 * | 7/2019 | Takahashi | B25J 19/007 |

FOREIGN PATENT DOCUMENTS

WO   WO-8803462 A1 *   5/1988   .................. F16J 3/06

* cited by examiner

*Primary Examiner* — Dean J Kramer

(74) *Attorney, Agent, or Firm* — Patterson + Shendan, LLP

(57) ABSTRACT

Aspects described herein include an end effector that includes a pliable body member defining an inner recess and having a sealing surface at a distal end. The sealing surface forms a seal with items and defines a first suction area. The end effector also includes an inflatable bladder that expands into the inner recess. When the bladder is in an inflated state, the bladder defines a second suction area smaller than the first suction area. The end effector also includes a vacuum port in fluid communication with the inner recess.

23 Claims, 11 Drawing Sheets

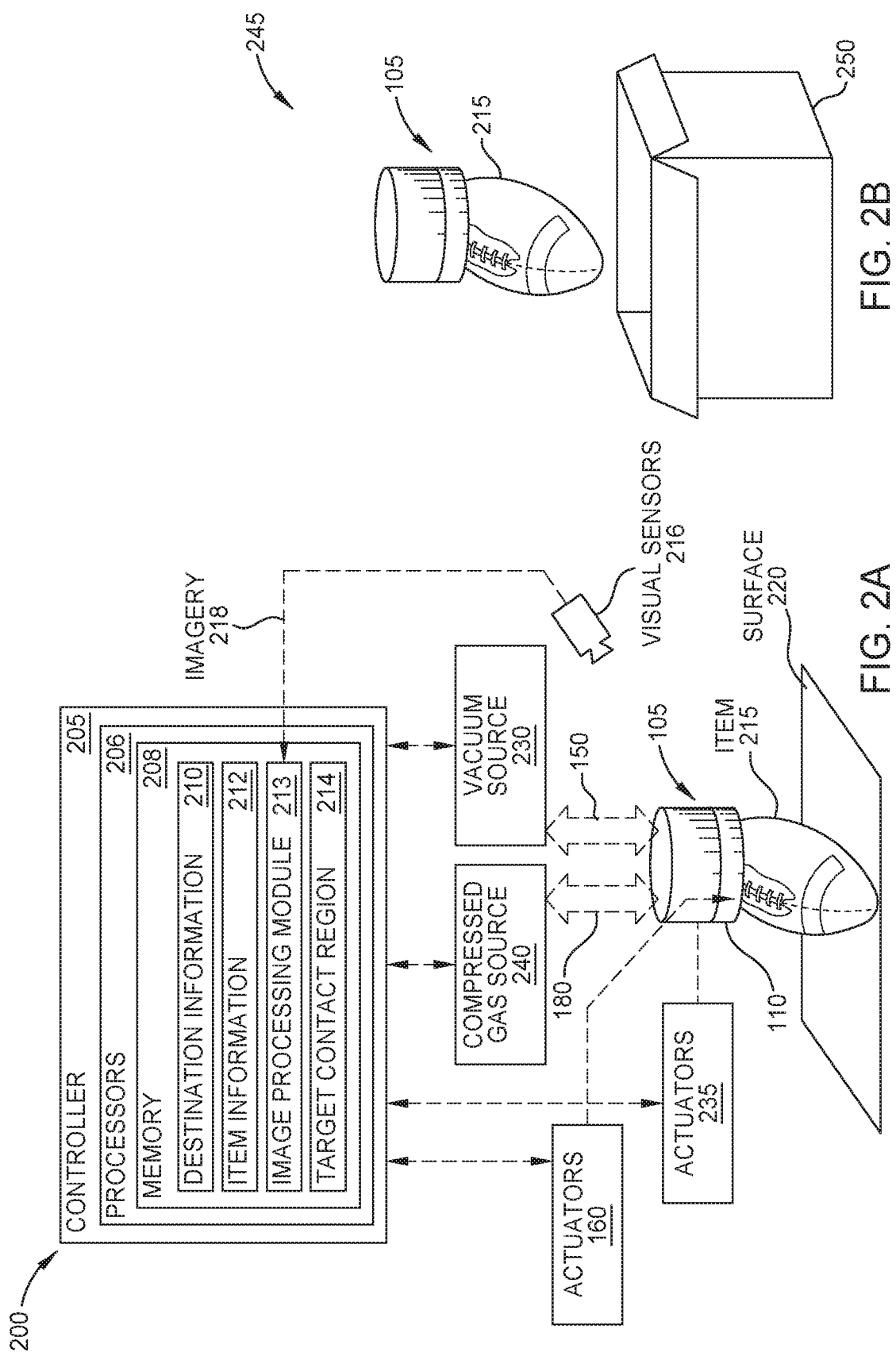

_US 11,267,137 B1_

CONTROLLING END EFFECTOR SUCTION AREA USING EXPANDABLE BLADDER

BACKGROUND

The present disclosure relates to suctioning items using an end effector, and more specifically, to implementations of a suction-based end effector with an expandable bladder for controlling the effective suction area.

In warehouse operations and other industrial automation settings, end effectors may be configured to perform the picking and handling of items. For example, end effectors such as suction cups or vacuum cups may be used to suction items as they are being moved between locations in a warehouse. The performance of suction-based end effectors is largely dependent on the quality of the seal formed with the suctioned item. More specifically, a suctioned item may be dropped by the end effector and/or damaged when inertial forces caused by moving the item overcome the suction force.

BRIEF DESCRIPTION OF DRAWINGS

Various embodiments in accordance with the present disclosure will be described with reference to the drawings, where like designations denote like elements.

FIGS. 2A, 2B illustrate moving an item using an end effector, according to various embodiments.

DETAILED DESCRIPTION

Figure 1A:
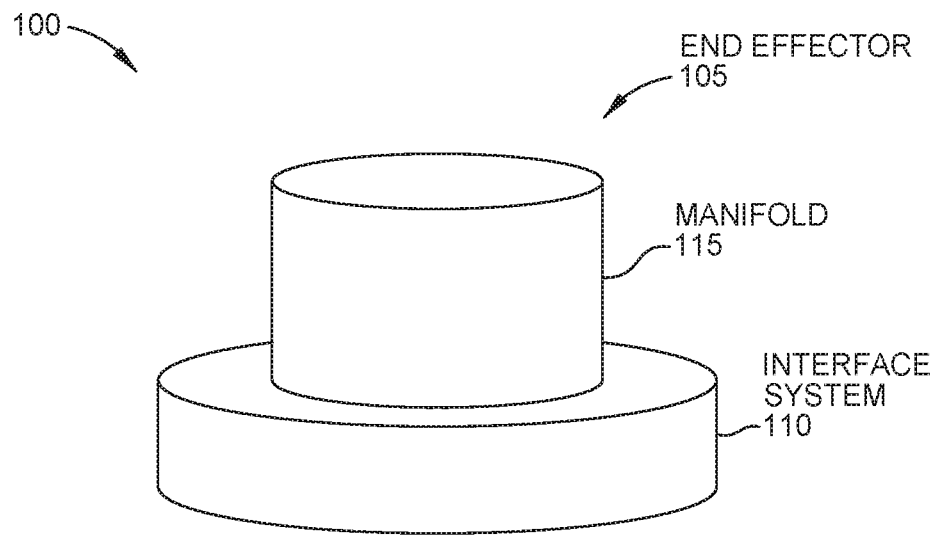
FIGS. 1A, 1B are diagrams of an exemplary end effector, according to various embodiments.

While conventional suction-based end effectors may be effective at moving items having relatively large planar surfaces, the ability to move items without suctioning a single planar surface (e.g., an item lacking a planar surface, an item having a planar surface that is inaccessible in a particular orientation of the item relative to the end effector, and so forth) remains a technical challenge. The end effectors described herein comprise an interface system having a pliable body member that presents a first suction area at a distal end of the pliable body member, and a bladder that is selectively inflatable (or otherwise expandable) to cause the end effector to present a second suction area less than the first suction area. Adjusting the suction area alters a geometry of a sealing surface (or surfaces) of the end effector that contacts the item so as to better contour about non-planar surfaces of the item, such as edges and curves. Through the cooperative operation of the pliable body member and the bladder, the end effector is capable of forming and maintaining an improved seal with the item, enabling items with complex and/or irregular shapes to be manipulated at greater velocities and/or accelerations without a loss of suction and/or without damaging the items.

In some embodiments, the end effector further comprises one or more actuators or elements (including passive elements) that are operable to selectively apply a force to a movable plate of the interface system, which moves and deforms the plate and/or deforms the interface system according to one or more degrees of freedom. For example, the plate may pivot and/or bend so as to conform the interface system. In some embodiments, the applied force deforms the pliable body member of the interface system, which alters a geometry of a sealing surface (or surfaces) that contacts the item so as to better contour about non-planar surfaces of the item, such as edges and curves. In some embodiments, the applied force alters a relative orientation of different sealing surfaces of the interface system. The end effector is capable of forming and maintaining an improved seal with the item also using through the plate and/or the deformed interface system.

According to one or more embodiments, a method of suctioning an item using an end effector is disclosed. The method comprises expanding a bladder into an inner recess of a pliable body member, such that the end effector presents a suction area less than a first suction area at a distal end of the pliable body member. The method further comprises contacting an item with the end effector while the bladder is expanded. Using the expanded bladder, the end effector is capable of forming and maintaining an improved seal with the item, enabling items with complex and/or irregular shapes to be manipulated at greater velocities and/or accelerations without a loss of suction and without damaging the items.

In some embodiments, the method further comprises, using imagery acquired by one or more visual sensors, identifying a target contact region of the item and determining a geometry of the target contact region. Determining to expand the bladder and/or to what extent to expand the bladder is based on the geometry of the target contact region, and the method may further comprise reorienting the interface system relative to the item based on the target contact region. In this way, the operation of the end effector may be adapted to accommodate the current orientation of an item. Further, by contacting the item in its current orientation and forming a relatively good seal with the deformed interface allows for faster movement of the item and supports a greater overall throughput of items.

Figure 1B:
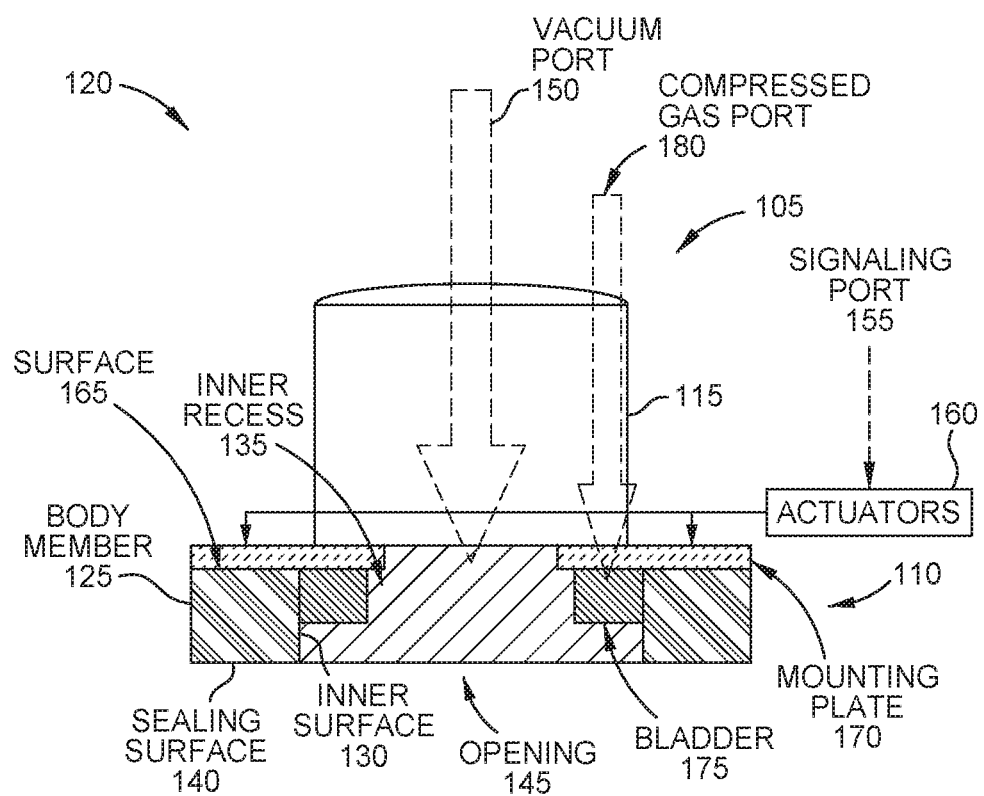

FIGS. 1A, 1B are diagrams 100, 120 of an exemplary end effector 105, according to various embodiments. More specifically, the diagram 100 represents an exterior view of the end effector 105, and the diagram 120 represents a cross-sectional view of the end effector 105. The end effector 105 may be used within an industrial automation system or any alternate environment suitable for moving items.

The end effector 105 comprises an interface system 110 attached to a manifold 115. The interface system 110 comprises a pliable body member 125 (or "body member") made of any pliable material(s) suitable for forming a seal with a contacting item and maintaining a vacuum. In some embodiments, the pliable body member 125 comprises a suitable closed cell or open cell foam. Some non-limiting examples of pliable materials include polymeric foams such as nitrile rubber foam, polyurethane foam, silicon foam, polychloroprene foam (neoprene), and so forth. Other non-limiting examples of pliable materials include elastomeric materials such as latex, rubber, and silicone.

The pliable body member 125 comprises an inner surface 130 defining an inner recess 135 (also referred to as a "region", a "central region", or a "vacuum region"). The pliable body member 125 may be monolithic or may comprise a plurality of sections arranged in such a manner that a vacuum may be formed and maintained between the pliable body member 125 and the item to be suctioned. The pliable body member 125 may have any suitable shape that defines the inner recess 135, such as an annular disk, a bellows suction cup, and so forth.

Although shown as being a continuous shape, in some cases the pliable body member 125 may define one or more gaps that accommodate the movement of material of the pliable body member 125 during deformation thereof. For example, the gaps may extend radially from a center of the pliable body member 125, and in some cases may be arranged relative to known locations where force is applied to deform the interface system 110. The one or more gaps are dimensioned such that only a minor amount of suction force is lost when the pliable body member 125 is in an undeformed state. Further, the one or more gaps may be partially or fully closed as material from the pliable body member 125 moves during deformation.

The pliable body member 125 may be configured to entirely circumscribe the inner recess 135. In some embodiments, when the pliable body member 125 is in an undeformed state, the inner surface 130 and/or the inner recess 135 have elliptical shapes, such as an ellipse or a circle. When viewed from a top view, the manifold 115 and the interface system 110 may have elliptical shapes that are concentric and not coextensive. However, other suitable shapes, sizes, coextensive, and/or non-concentric arrangements of the manifold 115 and the interface system 110 are also possible.

The pliable body member 125 further comprises a sealing surface 140 at a distal end of the pliable body member 125. The distal end of the pliable body member 125, at which items may be contacted and/or suctioned to the end effector 105, may correspond to a distal end of the end effector 105. The sealing surface 140 defines an opening 145 to the inner recess 135. In some embodiments, bringing an item into contact with the sealing surface 140 causes the sealing surface 140 to conform to a contour of the item and thereby seals the inner recess 135 from ambient. As discussed herein, forming a seal with an item (e.g., contacting the item to the sealing surface 140) does not strictly require that all suction force be maintained. It is contemplated that a minor amount of suction force may be lost while the end effector 105 suctions the item, so long as the maintained suction force is sufficiently large to withstand inertial forces expected when moving the item.

The end effector 105 presents a first suction area at a distal end of the pliable body member 125, corresponding to the dimensioning of the opening 145. The end effector 105 further comprises a bladder 175 that is inflatable (or otherwise expandable) to selectively cause the end effector 105 to present a second suction area less than the first suction area. In this way, the end effector 105 is capable of forming and maintaining an improved seal with an item suctioned to the end effector 105, enabling items having complex and/or irregular shapes to be manipulated at greater velocities and/or accelerations without a loss of suction and without damaging the items.

The bladder 175 may have any implementation suitable having sufficient flexibility and strength while inflated (or expanded) to seat against items while supporting suctioning of the item by the end effector 105. In some embodiments, the bladder 175 is formed of a polymer material having a high breaking strain, although other materials are also contemplated. The bladder 175 is dimensioned such that, when the bladder 175 is in an uninflated state, the bladder 175 does not interfere with performance of the end effector 105 to suction items using the pliable body member 125. For example, a thickness of the bladder 175 may be controlled such that the bladder 175 is suitably small when uninflated.

The bladder 175 may be monolithic or may comprise a plurality of bladder sections arranged in such a manner that a vacuum may be maintained between the bladder 175 and the item to be suctioned. For example, the different bladder sections may be spaced apart in a non-contacting relationship when uninflated, and contacting each other to form a substantially continuous surface when inflated. In some embodiments, the plurality of bladder sections are individually inflatable, such that a geometry of the bladder 175 may be dynamically controlled (e.g., responsive to a shape of the item).

The bladder 175 may be positioned inside or outside the inner recess 135. Stated another way, the bladder 175 may be arranged laterally inward or laterally outward of the pliable body member 125. In some embodiments, and as shown, the bladder 175 is positioned inside the inner recess 135 in the uninflated state and expands in the inner recess 135 toward the opening 145. The pliable body member 125 may entirely circumscribe the bladder 175. For example, the bladder 175 may contact (or be mounted to) the inner surface 130. In some cases, the bladder 175 extends out of the opening 145 when in the inflated state.

In other embodiments, the bladder 175 is positioned outside the inner recess 135 in the uninflated state and expands in the inner recess 135. In yet other embodiments, the bladder 175 is positioned outside the inner recess 135 in the uninflated state and expands outside the inner recess 135. For example, the bladder 175 may entirely circumscribe the pliable body member 125. In such cases, the bladder 175 may expand laterally inward (e.g., contacting the sealing surface 140 and extending partly over the opening 145) to define the second suction area.

In some embodiments, inflation of the bladder 175 causes the second suction area to have a different shape than that of the first suction area, which can further improve the capability of the end effector 105 to form and maintain a seal with the item. For example, the bladder 175 may comprise a plurality of individually inflatable bladder sections, and certain bladder sections may be selected and inflated to more closely correspond to the shape of the item.

The end effector 105 comprises a plurality of ports. A vacuum port 150 is in fluid communication with the inner recess 135 and is configured to apply a vacuum to the inner recess 135 (e.g., when sealed by the sealing surface 140 or by the bladder 175 when inflated). A compressed gas port 180 is in fluid communication with a chamber of the bladder 175, and a compressed gas (e.g., elemental gases such as nitrogen, mixed gases such as air) is selectively delivered from a gas source into the chamber to inflate the bladder 175.

A signaling port 155 is in communication with one or more actuators 160, and control signals communicated via the signaling port 155 cause the one or more actuators 160 to selectively apply a force to, or otherwise cause a compliant interaction with, the interface system 110. Depending on the configuration of the one or more actuators 160, the applied force deforms the interface system 110 according to one or more degrees of freedom.

In some embodiments, the interface system 110 further comprises a mounting plate 170 to which the pliable body member 125 and/or the bladder 175 are attached. The mounting plate 170 may have any suitable implementation for pivoting and/or deforming responsive to applied forces. For example, the mounting plate 170 may be formed as a pivotable plate having one or more pivot axes. Some exemplary implementations of the mounting plate 170 are described in U.S. patent application Ser. No. 16/018,748, which was filed Jun. 26, 2018 and entitled "End Effector With Selectively Deformable Interface". The patent application is herein incorporated by reference in its entirety.

In some embodiments, the mounting plate 170 pivots and/or deforms to further control a shape and/or sizing of the suction area presented by the end effector 105. In some embodiments, the mounting plate 170 pivots and/or deforms such that the end effector 105 provides impactive gripping in addition to the astrictive gripping provided by the vacuum.

In some embodiments, the mounting plate 170 has a greater rigidity than the pliable body member 125 and/or the bladder 175, and may be formed of different material(s) and/or differently dimensioned. For example, the greater rigidity of the mounting plate 170 may allow one or more actuators 160 to deform the pliable body member 125 without causing wear or damage thereto. In one embodiment, the mounting plate 170 comprises a rubber material, but other types of pliable materials are also possible. In some alternate embodiments, the mounting plate 170 may be rigid, such that application of the vacuum and/or the compressed gas does not cause the mounting plate 170 to deform.

In some alternate implementations, one or more actuators may contact and deform the pliable body member 125 directly (i.e., without an intermediate mounting plate 170).

The pliable body member 125 and/or the bladder 175 may be attached to the mounting plate 170 using any suitable techniques. In some embodiments, the pliable body member 125 and/or the bladder 175 are attached to the mounting plate 170 using one of an adhesive layer, a glue, and a fabric.

In some embodiments, the mounting plate 170 defines a plurality of openings extending therethrough. For example, the mounting plate 170 may define a first opening through which the vacuum port 150 is in fluid communication with the inner recess 135, and a second opening through which the compressed gas port 180 is in fluid communication with the chamber of the bladder 175. As shown in the diagram 120, the first opening may be centrally located and the second opening may be arranged laterally outward from the first opening. However, other implementations of the mounting plate 170 (e.g., different numbers of openings and/or difference relative arrangements) are also contemplated. In one alternate implementation, the bladder 175 is disposed outside the inner recess 135 (e.g., above the mounting plate 170) in an uninflated state, and extends through one or more openings in the mounting plate 170 into the inner recess 135 when in an inflated state.

In some embodiments, the force applied by the one or more actuators 160 to the mounting plate 170 causes the mounting plate 170 to move (for example, pivot). In some embodiments, the applied force deforms the pliable body member 125, which alters a geometry of the sealing surface 140. In some embodiments, the applied force alters a relative orientation of different sealing surfaces 140 of the interface system 110.

The one or more actuators 160 may be of any suitable type(s). For example, the one or more actuators 160 may be actuatable according to any suitable means, such as pneumatic, hydraulic, mechanical, motorized, and so forth. Further, the one or more actuators 160 may comprise active and/or passive actuators. Some non-limiting examples of the one or more actuators 160 include linear actuators and rotary actuators. In one embodiment, the one or more actuators 160 comprise one or more linear actuators attached to the interface system 110, and deforming the interface system 110 comprises increasing a length of the one or more linear actuators.

In some embodiments, the pliable body member 125 in an undeformed state has a surface 165 defined within a plane at a proximal end opposite the distal end. Stated another way, a proximal surface of the pliable body member 125 may be within a single plane in the undeformed state, regardless of the overall shape of the pliable body member 125. Conventional implementations of the pliable body member 125 (e.g., a foam suction cup) may be configured to maintain the surface 165 within the plane during operation (e.g., rigidly attached and not permitted to deform), which limits the ability of the foam suction cup to suction to irregular, complex, and/or heavy items. In such a case, the performance of the conventional foam suction cup is based solely on the compliance of the foam.

In some embodiments, the one or more actuators 160 may be used to apply force to the pliable body member 125 at the surface 165, whether directly or indirectly (e.g., via one or more intermediate components). In this way, one or more degrees of freedom are provided to manipulate the pliable body member 125, which permits the pliable body member 125 to be dynamically shaped to more closely match a surface geometry of an item to be suctioned. This increases the compatibility of the pliable body member 125 with different types of items having irregular or complex geometries. This also increases the quality of the seal formed with a suctioned item, allowing heavier items to be moved and/or the items to be moved more rapidly.

The manifold 115 may represent a continuously rigid portion of the end effector 105, and may be used to interface with other components of the industrial automation system. For example, one or more mechanical arms for spatially manipulating the end effector 105 (e.g., displacing and/or rotating) may be attached to the manifold 115. In another example, the manifold 115 may provide points of attachment to the end effector 105, e.g., such as attaching hoses to the vacuum port 150 and the compressed gas port 180 and/or attaching a cable, hose, etc. to the signaling port 155.

The manifold 115 may be formed of any suitable material(s), which may include relatively inelastic material(s) such as plastics or metals. However, in some cases, the manifold 115 may be formed of elastic material(s) and dimensioned to provide a greater rigidity than the pliable body member 125 in the first structural state. In one non-limiting example, the manifold 115 may be formed of a same elastomeric material as the pliable body member 125, but has a much greater thickness than walls of the pliable body member 125. In some cases, the manifold 115 formed of elastic material(s) may be deformable or selectively deformable.

The manifold 115 and the interface system 110 may be connected through any suitable means. In some embodiments, the manifold 115 and the interface system 110 are removably connected using threaded fasteners such as screws or bolts. In other embodiments, the manifold 115 and the interface system 110 are integrally formed.

FIGS. 2A, 2B illustrate moving an item using an end effector, according to various embodiments. The features illustrated in diagrams 200, 245 may be used in conjunction with other embodiments, such as the end effector 105 of FIGS. 1A and 1B.

The diagram 200 comprises a controller 205 that is configured to interface with the end effector 105 through at least the vacuum port 150 and the one or more actuators 160 via the signaling port 155. In some embodiments, the controller 205 is further configured to interface with the end effector 105 through one or more actuators 235 connected thereto. The one or more actuators 235 may have any suitable form, and may control the end effector 105 according to one or more degrees of freedom. For example, the one or more actuators 235 may be configured to translate and/or rotate the end effector 105. Some non-limiting examples of the one or more actuators 235 comprise articulating and/or telescoping robotic arms, which may attach to a proximal end of the end effector 105.

The controller 205 comprises one or more computer processors 206 and a memory 208. The one or more computer processors 206 represent any number of processing elements that each can include any number of processing cores. Some non-limiting examples of the one or more computer processors 206 include a microprocessor, a digital signal processor (DSP), an application-specific integrated chip (ASIC), and a field programmable gate array (FPGA), or combinations thereof. The memory 208 may comprise volatile memory elements (such as random access memory), non-volatile memory elements (such as solid-state, magnetic, optical, or Flash-based storage), and combinations thereof. Moreover, the memory 208 may be distributed across different mediums (e.g., network storage or external hard drives).

The memory 208 may comprise a plurality of "modules" for performing various functions described herein. In one embodiment, each module includes program code that is executable by one or more of the computer processors 206. However, other embodiments may include modules that are partially or fully implemented in hardware (i.e., circuitry) or firmware of the controller 205. As shown, the memory 208 comprises an image processing module 213 configured to perform image processing on imagery 218 received from one or more visual sensors 216 in the environment. The imagery 218 may have any suitable form, such as one or more still images or video.

In some embodiments, the image processing module 213 is configured to perform feature extraction and/or image segmentation of the imagery 218, although any other suitable techniques are also contemplated. The image processing performed on the imagery 218 may be used to locate and/or identify the item 215, and/or to determine a positioning and/or orientation of the end effector 105 relative to the item 215. In some embodiments, the memory 208 comprises item information 212 associated with the different items in the environment. Visual characteristics included in the item information 212 may be used by the image processing module 213 to identify the item 215 and/or identify an orientation of the item 215 (e.g., a comparison of the imagery 218 with the item information 212).

In some embodiments, the image processing module 213 is further configured to identify a target contact region 214 of the item 215. The target contact region 214 represents a region of the item 215 that is estimated to provide a relatively good seal with the interface system of the end effector 105. The target contact region 214 may be determined based on a current orientation of the item 215, and may be determined based on the assumption that the item 215 will not be displaced and/or rotated prior to the end effector 105 contacting the item 215. The image processing module 213 may comprise one or more predefined rules for determining the target contact region 214. For example, a first rule may specify that planar surfaces are preferred for the target contact region 214 over rounded surfaces or corners, a second rule may specify that larger surfaces are preferred to smaller surfaces, and a third rule may specify that a corner having a linear (or other elongated) intersection is preferred to a corner having a point intersection. The one or more predefined rules may be based on properties of the end effector 105 (e.g., values or ranges of size, shape, vacuum force, etc.), which may reflect deformation of the interface system by the one or more actuators 160. The one or more predefined rules may also be prioritized relative to each other.

For example, assume that the item 215 has a rectangular shape, with relatively large planar surfaces (e.g., larger than an inner diameter of the inner recess of the end effector 105 in an undeformed state) on two sides, and relatively small planar surfaces (e.g., smaller than the inner diameter) on the other four sides. However, assume further that the large planar surfaces of the item 215 are partially or completely inaccessible by the end effector 105 in a current orientation of the item 215 (e.g., the item 215 is obscured by other items, resting against a surface such as a sidewall or floor, etc.). As it is not feasible to contact only a large planar surface in the current orientation of the item 215, the image processing module 213 may select a "next-best" target contact region, such as an elongated intersection of two sides as specified by the example third rule above.

In conjunction with identifying the target contact region 214, the image processing module 213 may determine a geometry of the target contact region 214. Based on the geometry of the target contact region 214, the controller 205 may send control signals to the one or more actuators 160 to deform the interface system of the end effector 105. The controller 205 may additionally or alternately send control signals to the one or more actuators 235 to reorient the interface system relative to the item 215 prior to contacting the item 215.

In some embodiments, the controller 205 is configured to transmit control signals to the one or more actuators 235 to provide the end effector 105 with a desired positioning and/or orientation for contacting and/or handling the item 215. In the diagram 200, the end effector 105 has been brought into contact with the item 215 resting on a surface 220. In some alternate embodiments, the end effector 105 and/or the item 215 may be manually moved to provide the contacting relationship, and/or to displace the end effector 105 and the suctioned item 215 to the predefined location. For example, the end effector 105 may include a handle allowing a user to rotate and/or displace the end effector 105.

In some embodiments, the controller 205 is transmits control signals to a compressed gas source 240 to selectively apply a compressed gas to a chamber of a bladder (e.g., the bladder 175) of the end effector 105. The compressed gas source 240 may have any suitable implementation, such as a compressor that delivers pressurized atmospheric air to the compressed gas port 180 via a flexible hose. Applying the compressed gas to the bladder operates to inflate (or expand) the bladder, which causes the end effector 105 to present a smaller suction area. In some embodiments, the controller 205 operates the compressed gas source 240 to place the bladder in a selected one of two discrete states: an uninflated state and an inflated state. In other embodiments, the controller 205 operates the compressed gas source 240 to control to what extent to the bladder is inflated (e.g., a plurality of inflated states corresponding to different suction areas). For example, the controller 205 may determine a target value for the suction area and apply the compressed gas to the chamber to achieve the target value. The extent to which the bladder is inflated may be based on the geometry of the target contact region 214 of the item 215. In some embodiments, the controller 205 transmits control signals to the compressed gas source 240 to release some or all of the compressed gas after the item 215 has been moved to the predefined location (which may increase the suction area).

In some embodiments, the controller 205 is configured to transmit control signals to a vacuum source 230 to selectively apply a vacuum to the inner recess of the end effector 105. The vacuum source 230 may have any suitable implementation, such as a vacuum pump connected to the vacuum port 150 via a flexible hose. Applying the vacuum to the inner recess operates to suction the item 215 to the end effector 105. In some embodiments, the controller 205 transmits control signals to the vacuum source 230 to release the vacuum when the item 215 has been moved to the predefined location.

The controller 205 may further transmit control signals to the one or more actuators 235 to displace the end effector 105 and the now-suctioned item 215 to a predefined location, which in some cases may be specified by destination information 210 included in the memory 208 and associated with the item 215. The destination information 210 may have any suitable form, such as a destination within the warehouse (e.g., a particular container 250 or a particular environment location), a destination external to the warehouse (e.g., a portion of a destination mailing address or a particular vehicle for external transport), and so forth. In some embodiments, the controller 205 acquires the destination information 210 from one or more computing devices that are networked with the controller 205.

Figure 3:
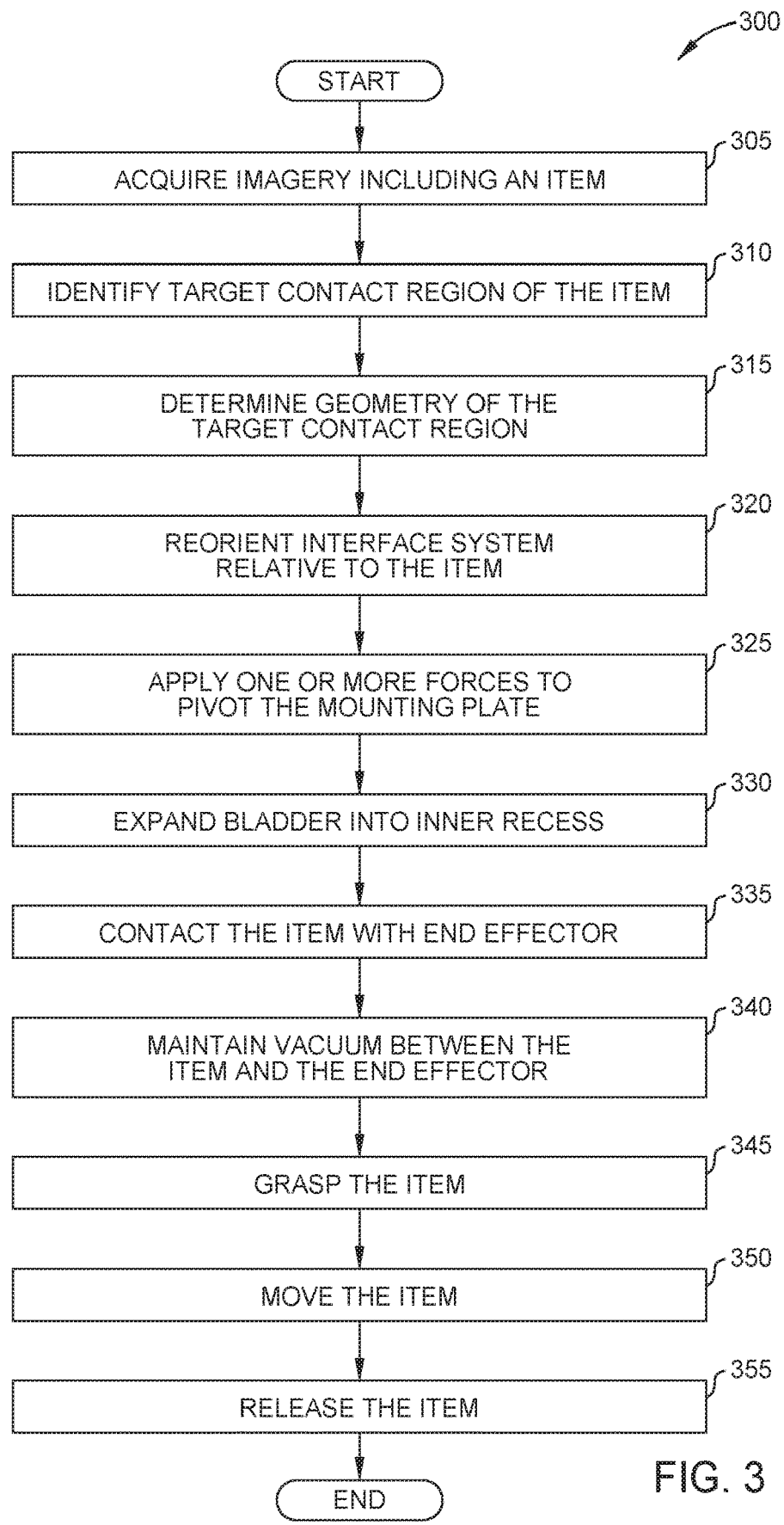
FIG. 3 illustrates an exemplary method of moving items using an end effector, according to various embodiments.

Next, method 300 of FIG. 3 will be described with reference to FIGS. 2A and 2B. The method 300 begins at block 305, where the controller 205 using one or more visual sensors 216 acquires imagery 218 including an item 215. At block 310, the image processing module 213 identifies, using the imagery 218, a target contact region 214 of the item 215. At block 315, the image processing module 213 determines a geometry of the target contact region 214. At block 320, the controller 205 reorients an interface system 110 of the end effector 105 relative to the item 215 based on the target contact region 214.

At block 325, one or more forces are applied to pivot a mounting plate of the interface system 110. In some embodiments, applying the one or more forces causes a first portion of the mounting plate to pivot about a first axis. The first portion is movable relative to at least a second portion of the mounting plate. In some embodiments, applying the one or more forces also causes the second portion of the mounting plate to move. In some embodiments, the controller 205 controls the one or more actuators 160 to deform the interface system 110 according to one or more degrees of freedom. In some embodiments, the controller 205 causes the vacuum source 230 to apply a suction force to an inner recess of the interface system 110, which deforms the interface system 110.

At block 330, the controller 205 expands a bladder into the inner recess. In some embodiments, the controller 205 controls the compressed gas source 240, which expands the bladder to an inflated state. When the bladder is in the inflated state, the end effector 105 presents a smaller suction area. At block 335, the item 215 is contacted with the end effector 105 while the bladder is expanded.

At block 340, the controller 205 maintains a vacuum between the item 215 and the bladder to retain the item 215. The vacuum may be applied to the inner recess of the interface system 110. At block 345, the end effector 105 optionally grasps the item via the interface system 110. In this way, the end effector 105 may provide impactive gripping in addition to the astrictive gripping provided by the vacuum. At block 350, the controller 205 moves the item 215. At block 355, the controller 205 releases the item 215 by releasing the vacuum on the item 215 when positioned at a predefined location. The method 300 ends following completion of block 355.

Figures 4A, 4B:
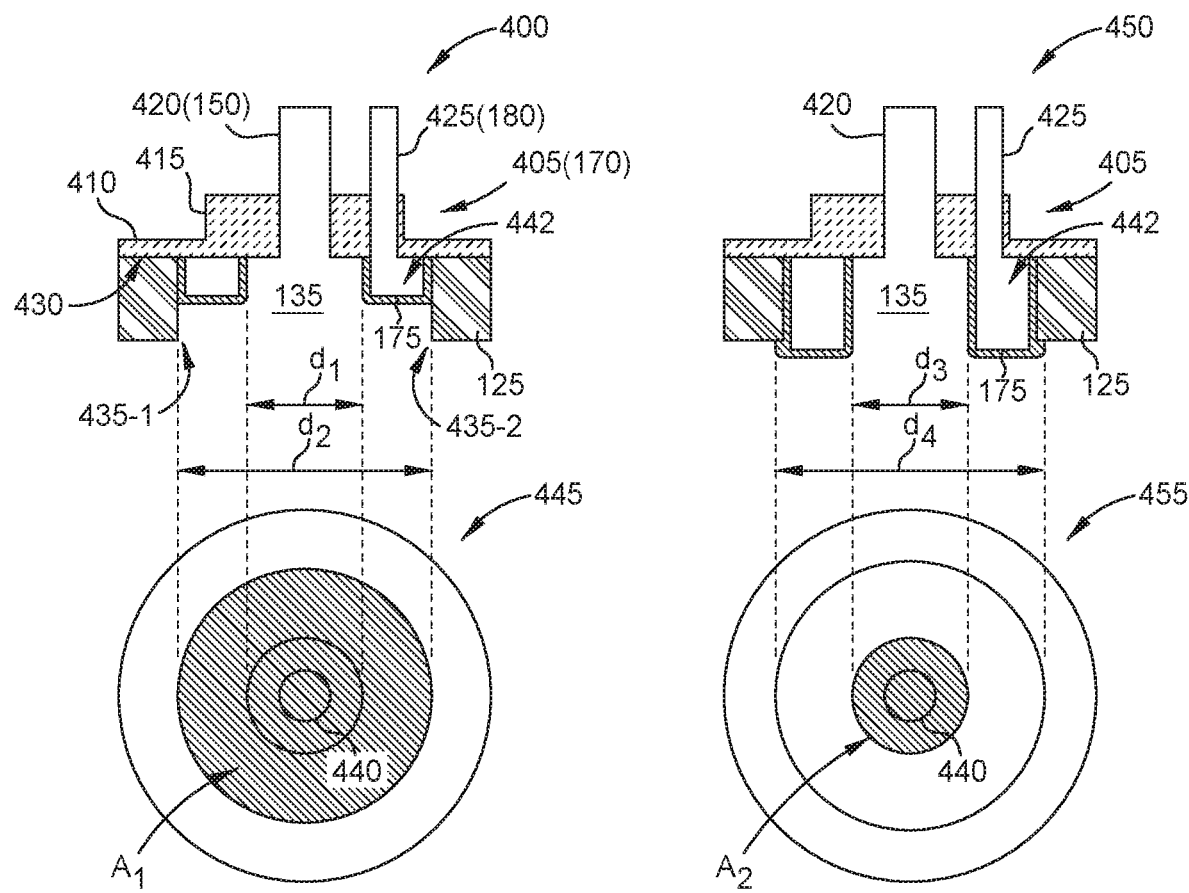
FIG. 4A includes views of an end effector with an unexpanded bladder, according to various embodiments.
FIG. 4B includes views of an end effector with a bladder expanded into an inner recess, according to various embodiments.

FIG. 4A includes views of an end effector with an unexpanded bladder, according to various embodiments. More specifically, FIG. 4A provides a cross-sectional view 400 and a bottom view 445 of the end effector.

Figure 5:
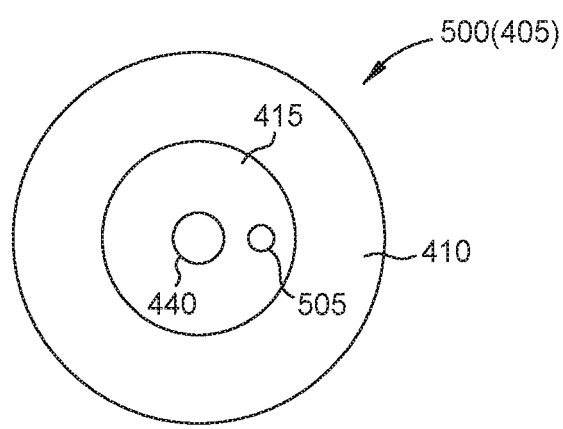
FIG. 5 is a bottom view of an exemplary mounting plate, according to various embodiments.

The end effector comprises a mounting plate 405 (representing one example of the mounting plate 170), which as shown comprises a base portion 410 and a raised portion 415 extending from the base portion 410. The base portion 410 defines a surface 430 at the distal end. Referring also to the bottom view 500 of FIG. 5, the base portion 410 and the raised portion 415 are circular and concentric, although other implementations with different shape(s) and/or a non-concentric arrangement are also contemplated. In an alternate implementation, the mounting plate 405 need not include the raised portion 415.

As shown, the pliable body member 125 and the bladder 175 are mounted to the mounting plate 405 at the surface 430 (e.g., using glue or an adhesive layer). As shown, the bladder 175 contacts inner walls 435-1, 435-2 of the pliable body member 125. In some cases, the bladder 175 is also mounted to the inner walls 435-1, 435-2.

A first opening 440 extends through the mounting plate 405, and a second opening 505 is arranged laterally outward from the first opening 440. As shown, the first opening 440 is centrally located, although other relative positioning is other contemplated. A vacuum port 420 (representing one example of the vacuum port 150) is arranged at the first opening 440 and is in fluid communication with the inner recess 135. A compressed gas port 425 is arranged at the second opening 505 and is in fluid communication with a chamber 442 of the bladder 175. The vacuum port 420 and/or the compressed gas port 425 may have any suitable implementation, such as metal or plastic fittings that are partly or fully inserted into the respective one of the first opening 440 and the second opening 505. The vacuum port 420 and/or the compressed gas port 425 may be fixedly or removably attached with the mounting plate 405 through any suitable means, such as adhesive, complementary threads, and so forth. The vacuum port 420 and/or the compressed gas port 425 may connect with flexible hoses through any suitable means, such as barbed stems, hose clamps, and so forth. In some embodiments, the chamber 442 and the inner recess 135 are concentrically arranged, although non-concentric arrangements are also contemplated.

In FIG. 4A, the bladder 175 is in an uninflated (or unexpanded) state, and is positioned within the inner recess 135. The bladder 175 has an inner diameter $d_1$ and the pliable body member 125 has an inner diameter $d_2$. In the uninflated state of the bladder 175, the end effector presents a first suction area $A_1$ that corresponds to a circle having a diameter equal to the inner diameter $d_2$. In one alternate implementation, the bladder 175 in the uninflated state is positioned outside the inner recess 135. For example, the bladder 175 when uninflated may be disposed within the mounting plate 405 (e.g., within the raised portion 415 and/or the base portion 410). In this case, the base portion 410 defines an opening through which the bladder 175 may expand into the inner recess 135 during inflation. In another alternate implementation, the bladder 175 may be integrated into the pliable body member 125. For example, the pliable body member 125 may define a recess in which the bladder 175 is arranged, as well as one or more openings through which the bladder 175 expands, to expand into the inner recess 135 during inflation.

FIG. 4B provides a cross-sectional view 400 and a bottom view 445 of the end effector, in which the bladder 175 is expanded into the inner recess 135. More specifically, the bladder 175 is in an inflated state after a compressed gas is delivered to the chamber 442, which causes the bladder 175 to expand into the inner recess 135. As shown, the bladder 175 in the inflated state extends out of the inner recess 135. The bladder 175 has an inner diameter $d_3$ and an outer diameter $d_4$ when in the inflated state. The inner diameter $d_3$ may be the same as the inner diameter $d_1$, or may be less than the inner diameter $d_1$ (e.g., the bladder 175 expands laterally inward as it inflates). In the inflated state of the bladder 175, the end effector presents a second suction area $A_2$ that is less than the first suction area $A_1$. The second suction area $A2$ corresponds to a circle having a diameter equal to the inner diameter $d_3$. In this way, the end effector is capable of forming and maintaining an improved seal with an item suctioned to the end effector, enabling items having complex and/or irregular shapes to be manipulated at greater velocities and/or accelerations without a loss of suction and without damaging the items.

Figure 6A:
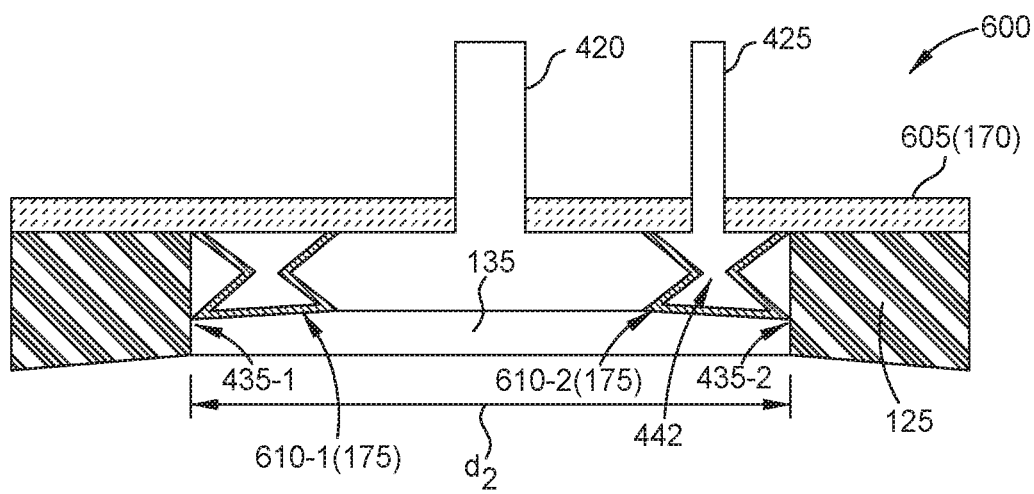
FIGS. 6A, 6B are cross-sectional views of an end effector with a bladder having inflatable bellows, according to various embodiments.
Figure 6B:
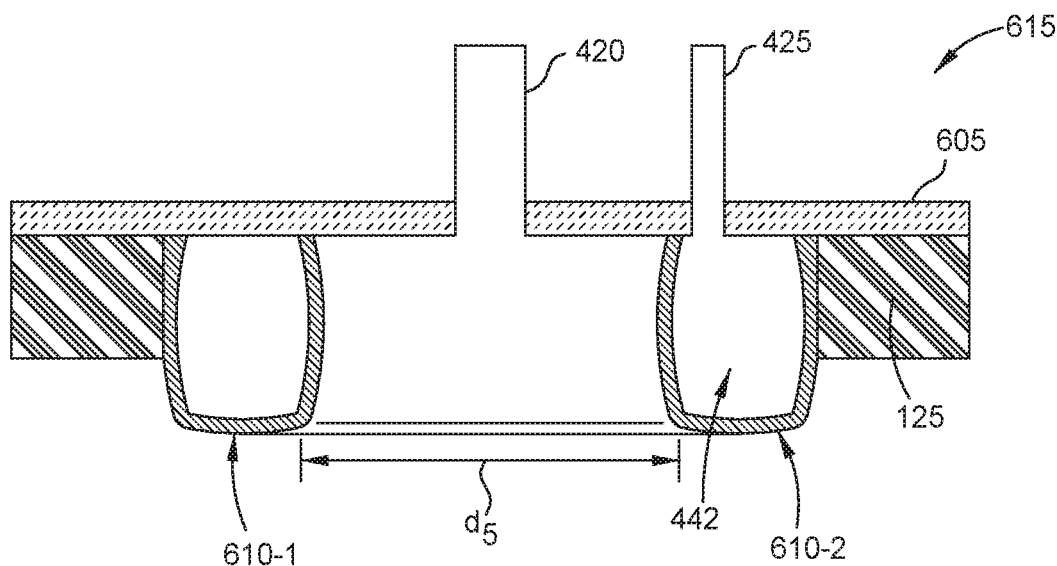

FIGS. 6A, 6B are cross-sectional views 600, 615 of an end effector with the bladder 175 having inflatable bellows 610-1, 610-2, according to various embodiments. As shown, the bladder 175 comprises two bellows 610-1, 610-2 that may be part of a continuous bellows, or that may be individually inflated.

In the cross-sectional view 600, the bladder 175 is in an uninflated (or unexpanded) state, and is positioned fully within the inner recess 135. In the uninflated state, the bellows 610-1, 610-2 are partially or fully folded within the inner recess 135. In the uninflated state, the end effector presents a suction area that corresponds to the inner diameter $d_2$ of the pliable body member 125.

In the cross-sectional view 615, the bladder 175 is in an inflated (or expanded) state, where the bellows 610-1, 610-2 expand into the inner recess 135. As shown, the bellows 610-1, 610-2 when inflated extend out of the inner recess 135. In the inflated state, the end effector presents a suction area that corresponds to an inner diameter $d_5$ defined by the inflated bellows 610-1, 610-2.

Figure 7:
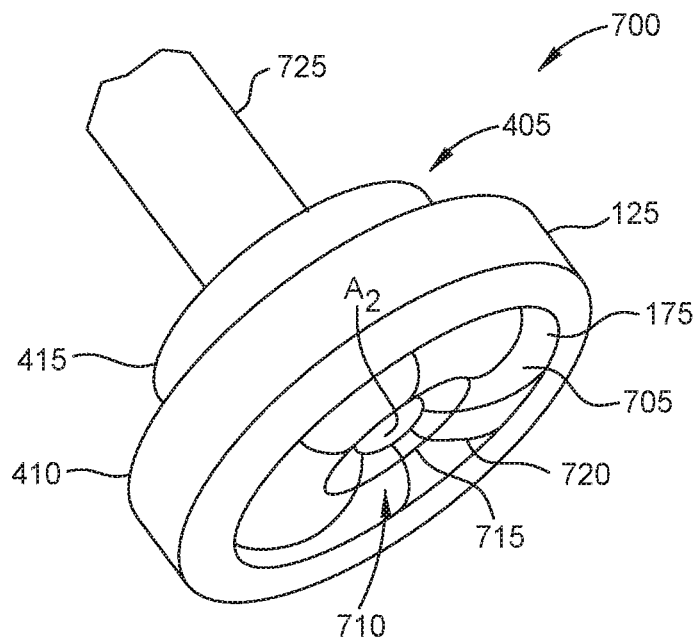
FIG. 7 is a perspective view of an end effector having a reinforcing structure, according to various embodiments.

FIG. 7 is a perspective view 700 of an end effector having a reinforcing structure 710, according to various embodiments. The reinforcing structure 710 controls a profile of an external surface 705 of the bladder 175 when in the inflated state, which may affect the sealing ability of the end effector. For example, the reinforcing structure 710 may have a rigidity greater than that of the bladder 175, and may limit the extent of the inflation of the bladder 175 along one or more dimensions when the bladder 175 is not contacting an item. Stated another way, the rigidity of the reinforcing structure 710 may control the profile of the external surface 705 when the bladder 175 is not contacting an item, and the rigidity of the item may control the profile of the external surface 705 when the bladder contacts the item. In some cases, the reinforcing structure 710 may limit the suction area $A_2$.

The reinforcing structure 710 may have any suitable implementation. In some embodiments, the reinforcing structure 710 is disposed on the external surface 705, disposed on an internal surface of the bladder 175 opposite the external surface 705, embedded in the wall of the bladder 175, or combinations thereof. As shown in the perspective view 700, the reinforcing structure 710 comprises a plurality of radial ribs 720 and a plurality of meridian ribs 715. The plurality of radial ribs 720 and the plurality of meridian ribs 715 may be formed of any suitable material(s). In one example, the plurality of radial ribs 720 and the plurality of meridian ribs 715 are formed of a same elastomeric material as the bladder 175 but with a greater thickness than the walls of the bladder 175. In another example, the plurality of radial ribs 720 and the plurality of meridian ribs 715 comprise fibers of any material having suitable strength, such as metal, textile, glass, and so forth.

Figure 8:
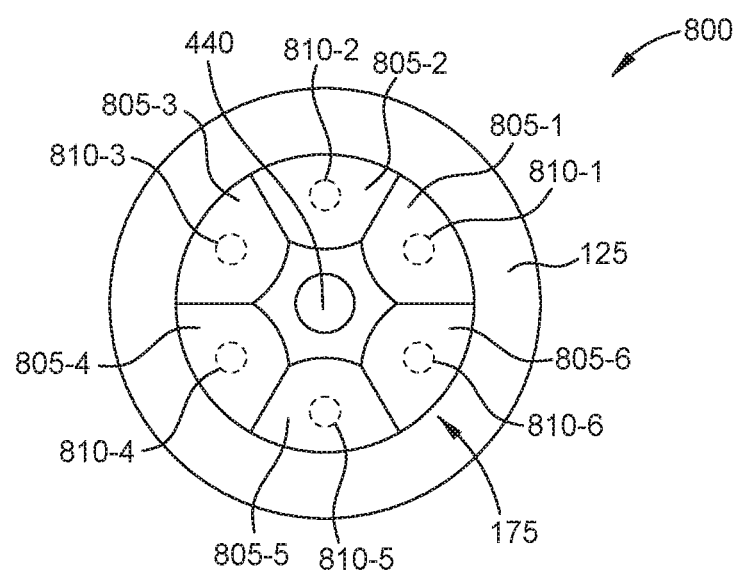
FIG. 8 is a bottom view of an end effector having a plurality of individually inflatable bladder sections, according to various embodiments.
Figure 9A:
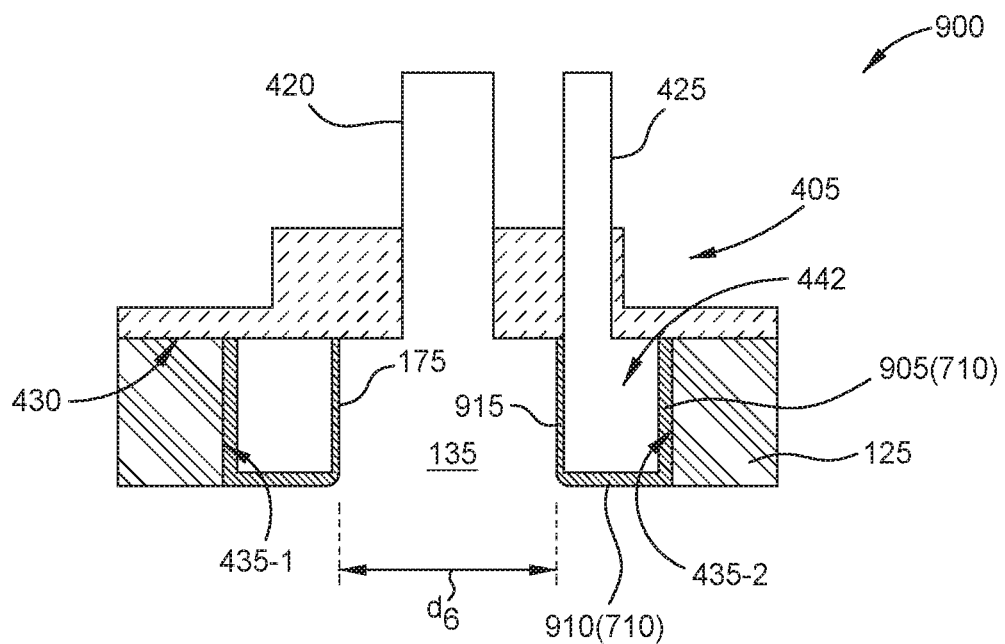
FIGS. 9A-9D are cross-sectional views of an end effector with a bladder mounted to an inner wall of a pliable body member, according to various embodiments.
Figure 9B:
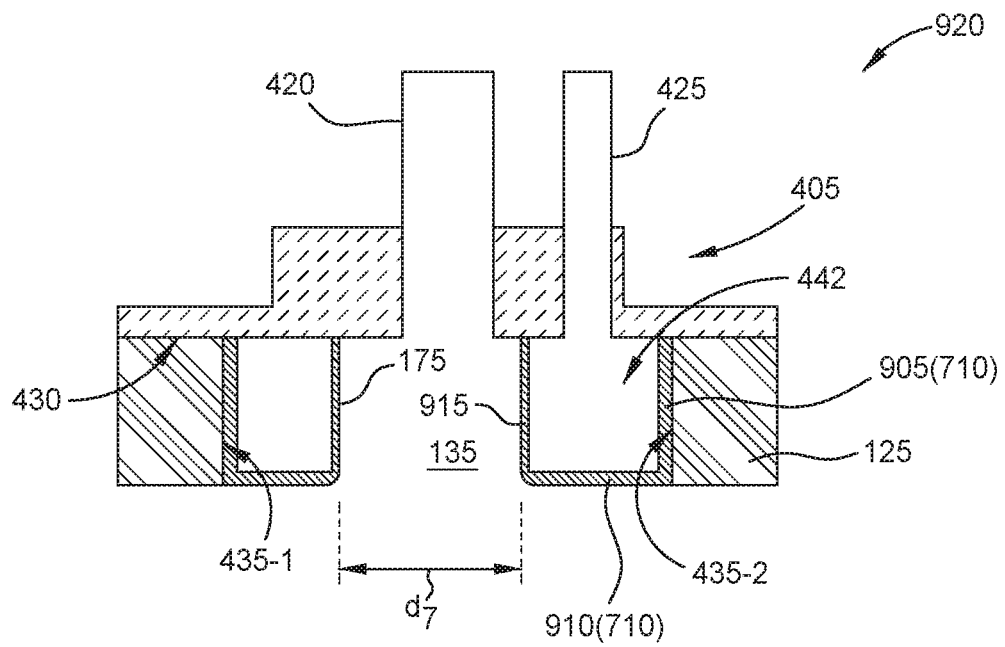
Figure 9C:
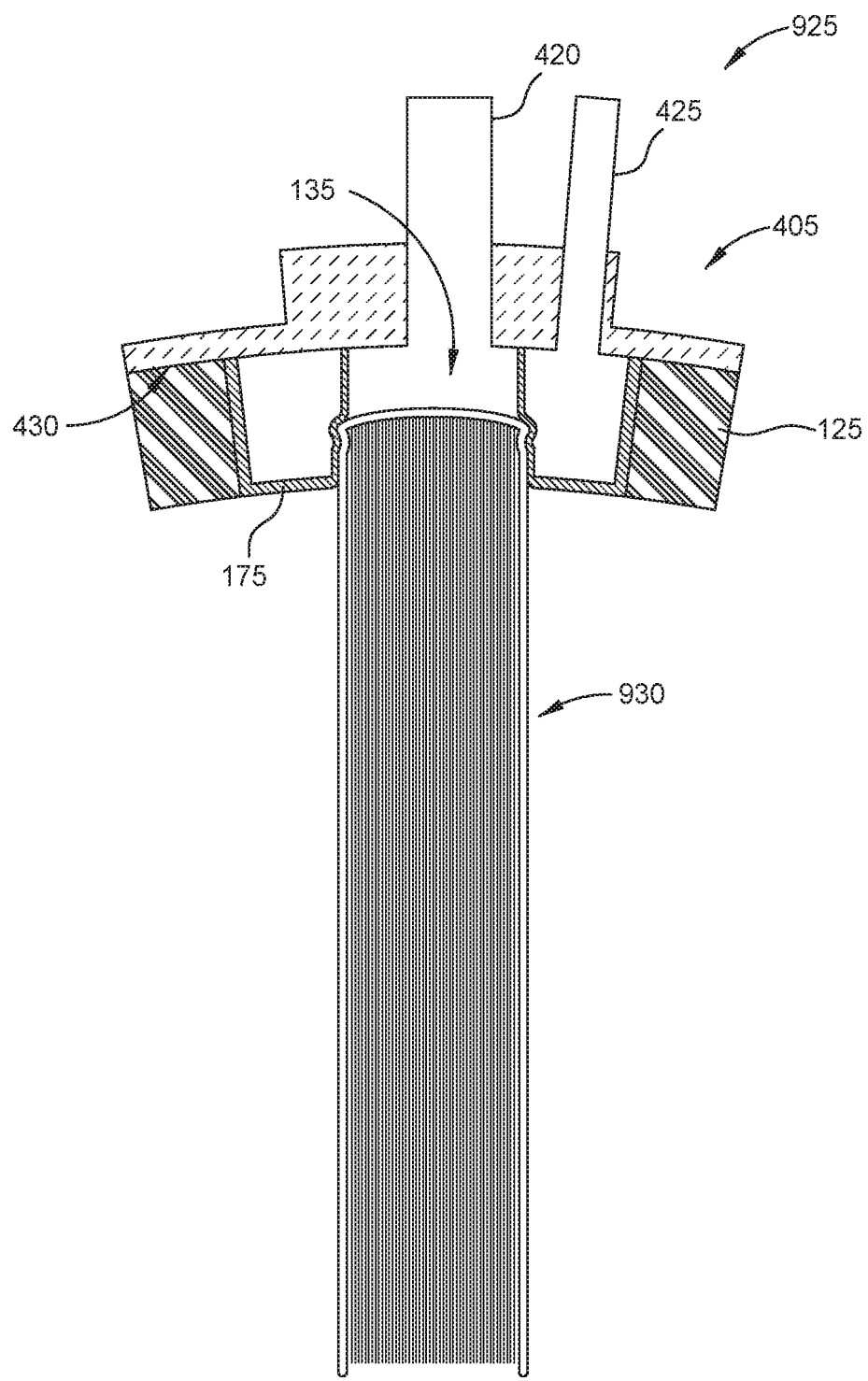
Figure 9D:
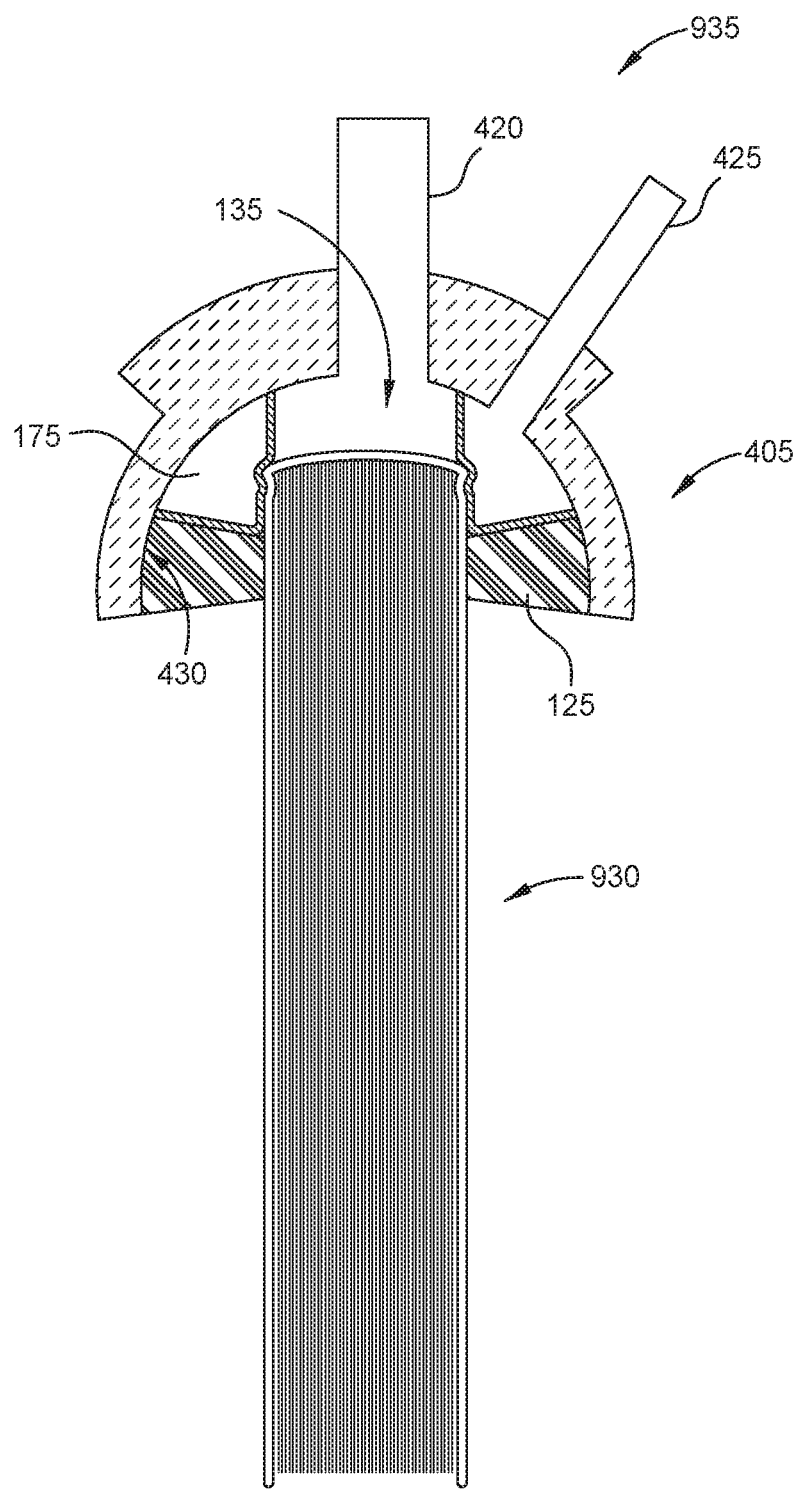

FIG. 8 is a bottom view 800 of an end effector having a plurality of individually inflatable bladder sections, according to various embodiments. More specifically, the bladder 175 comprises a plurality of bladder sections 805-1, 805-2, ..., 805-6 that are circumferentially arranged around the first opening 440. Each of the plurality of bladder sections 805-1, 805-2, ..., 805-6 has a respective chamber in fluid communication with a respective opening 810-1, 810-2, ..., 810-6 (e.g., extending through the mounting plate). Compressed gas may be provided by one or more compressed gas sources to the plurality of bladder sections 805-1, 805-2, ..., 805-6 via the openings 810-1, 810-2, ... 810-6.

The plurality of bladder sections 805-1, 805-2, ... 805-6 may be contacting or non-contacting when in an uninflated state. In some cases, when inflated, adjacent bladder sections of the plurality of bladder sections 805-1, 805-2, ..., 805-6 may be contacting to form a single, substantially continuous external surface of the bladder 175. In some cases, the adjacent bladder sections may form multiple substantially continuous regions of the external surface of the bladder 175. In one example, the bladder sections 805-1, 805-2 are contacting to form a first region, the bladder sections 805-3, 805-6 are uninflated, and the bladder sections 805-4, 805-5 are contacting to form a second region). The contacting bladder sections tend to improve the ability of the end effector to form and maintain a seal with an item.

In some embodiments, the bladder sections 805-1, 805-2, ... 805-6 are individually inflated based on the shape and/or the target contact region of the item. Continuing the previous example, the bladder sections 805-3, 805-6 may be uninflated where the item is to be suctioned along a long, thin surface (e.g., a spine of a book) that is aligned with a notional axis passing through the bladder sections 805-3, 805-6. Dynamic control of the individually inflatable bladder sections tends to improve the ability of the end effector to form and maintain a seal with an item.

FIGS. 9A-9D are cross-sectional views 900, 920, 925, 935 of an end effector with the bladder 175 mounted to an inner wall of a pliable body member 125, according to various embodiments.

In the cross-sectional view 900, the bladder 175 is in an uninflated state, and is mounted to the mounting plate 405 and to inner walls 435-1, 435-2 of the pliable body member 125. The bladder 175 comprises an outer wall 905, a bottom wall 910, and an inner wall 915. As shown, the outer wall 905 contacts the inner walls 435-1, 435-2. In some embodiments, the inner walls 435-1, 435-2 are part of a substantially continuous inner wall of the pliable body member 125. In other embodiments, the inner walls 435-1, 435-2 may be independent of each other.

When the bladder 175 is in the uninflated state, the end effector presents a suction area corresponding to an inner diameter $d_6$ defined by the inner wall 915 of the uninflated bladder 175. As the bladder 175 is inflated, the bladder 175 preferentially expands laterally inward into the inner recess 135 due to being mounted to the pliable body member 125 (e.g., the outer wall 905 of the bladder 175 contacting the inner walls 435-1, 435-2 of the pliable body member 125). Further, in some embodiments, the outer wall 905 and the bottom wall 910 comprises the reinforcing structure 710 to cause the bladder 175 to preferentially expand laterally inward. Using one example of the reinforcing structure 710, the outer wall 905 and the bottom wall 910 may have a greater thickness than the inner wall 915, such that the inner wall 915 tends to deform before the outer wall 905 and the bottom wall 910 as the bladder 175 is inflated. As shown in the cross-sectional view 920, when the bladder 175 is in the inflated state, the end effector presents a smaller suction area corresponding to a diameter $d_7$ that is less than the diameter $d_6$.

In the cross-sectional view 925, a vacuum is applied to the inner recess 135 via the vacuum port 420, which causes the mounting plate 405 to deform and alters a geometry of the sealing surface at the distal end of the pliable body member 125. In another embodiment, one or more actuators may also be used to deform the mounting plate 405. The bladder 175 is in an inflated state and contacts the spine of a book 930 (representing one example of the item 215 of FIG. 2). In this way, a vacuum may be maintained between the book 930 and the bladder 175 for the end effector to retain the book 930.

In the cross-sectional view 935, the mounting plate 405 deforms further such that both the bladder 175 and the pliable body member 125 contact the book 930. In this way, the end effector provides impactive gripping in addition to the astrictive gripping provided by the vacuum.

Figure 10A:
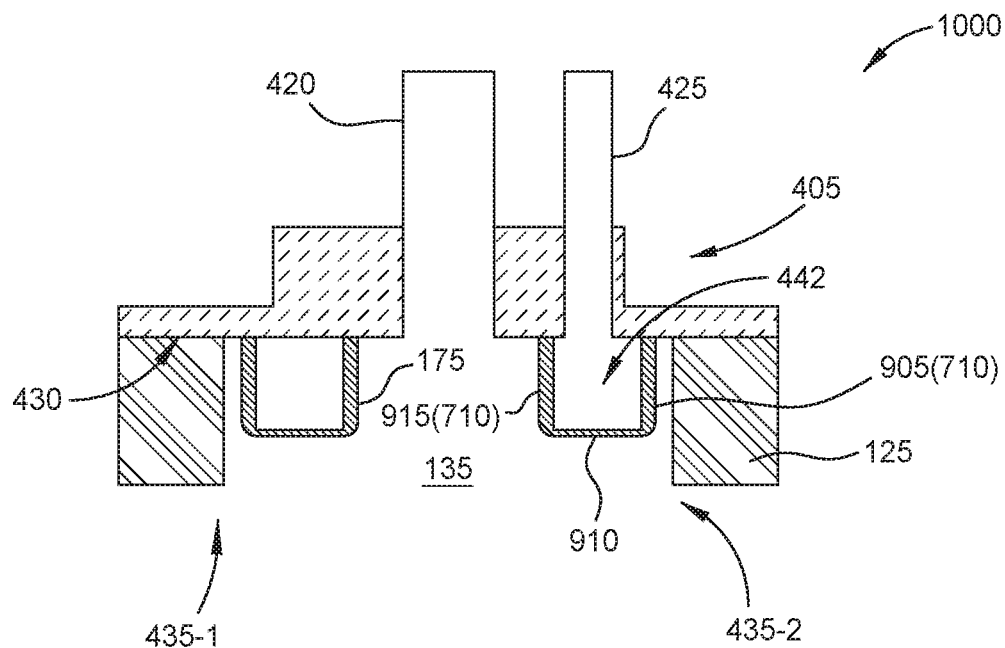
FIGS. 10A, 10B are cross-sectional views of an end effector with a bladder having a reinforcing structure, according to various embodiments.
Figure 10B:
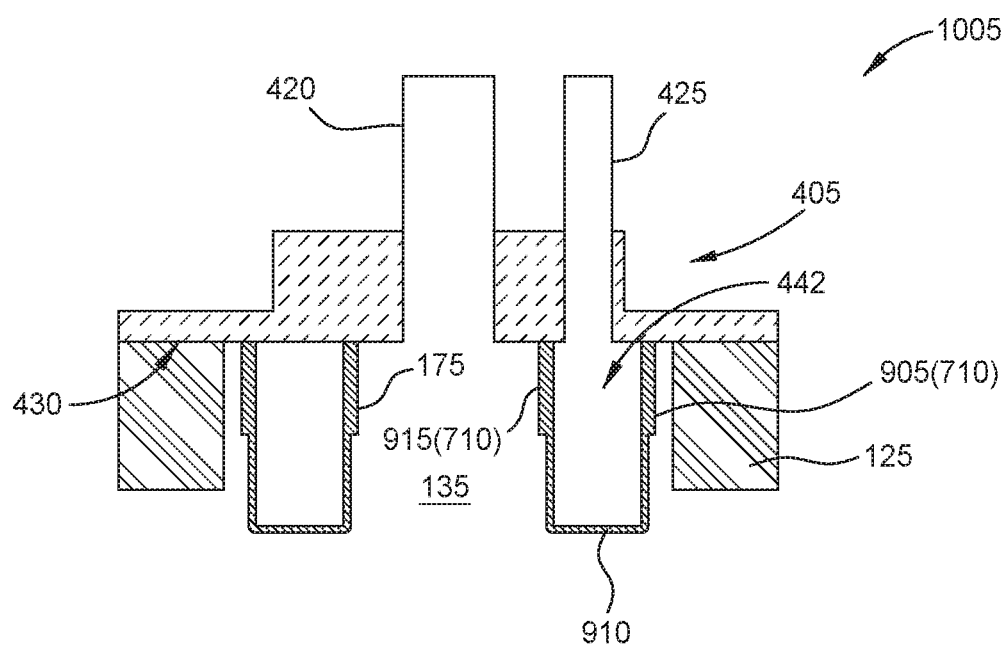

FIGS. 10A, 10B are cross-sectional views 1000, 1005 of an end effector with a bladder having a reinforcing structure, according to various embodiments.

In the cross-sectional view 1000, the bladder 175 is in an uninflated state, and is mounted to the mounting plate 405. The bladder 175 is positioned within the inner recess 135. The outer wall 905 and the inner wall 915 of the bladder 175 comprise the reinforcing structure 710 to cause the bladder 175 to preferentially expand distally (in a downward direction) as the bladder 175 is inflated. Using one example of the reinforcing structure 710, the outer wall 905 and the inner wall 915 may have a greater thickness than the bottom wall 910, such that the bottom wall 910 tends to deform before the outer wall 905 and the inner wall 915 as the bladder 175 is inflated. In the cross-sectional view 1005, the bladder 175 in the inflated state extends out of the inner recess 135, such that the end effector presents a smaller suction area than that defined by the pliable body member 125.

Figure 11A:
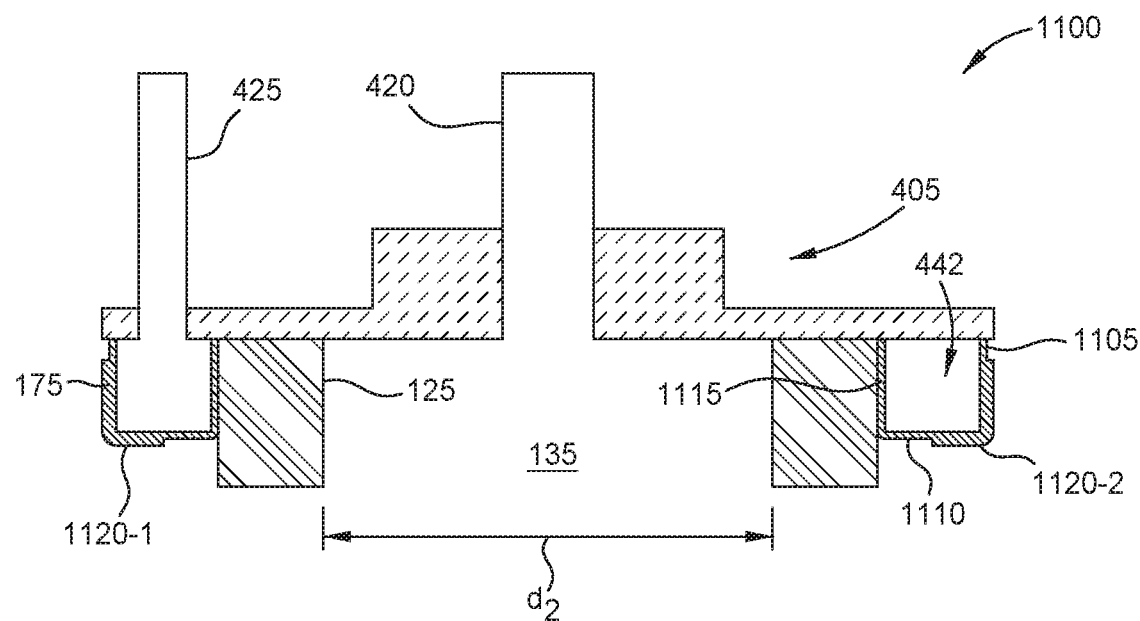
FIGS. 11A, 11B are cross-sectional views of an end effector with a bladder arranged laterally outward from a pliable body member, according to various embodiments.
Figure 11B:
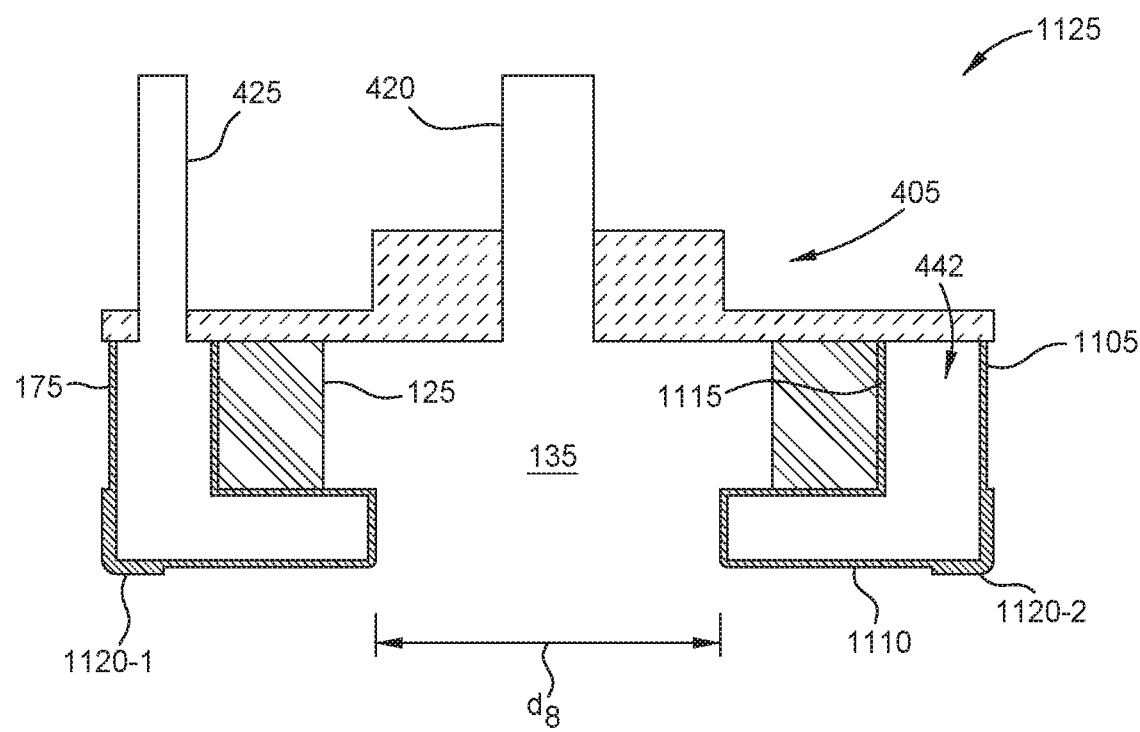

FIGS. 11A, 11B are cross-sectional views 1100, 1125 of an end effector with the bladder 175 arranged laterally outward from the pliable body member 125, according to various embodiments. As shown in the cross-sectional view 1100, the bladder 175 in the uninflated state circumscribes the pliable body member 125. The bladder 175 comprises reinforcing structures 1120-1, 1120-2 that are partly included in a side wall 1105 and partly included in a bottom wall 1110 of the bladder 175. The reinforcing structures 1120-1, 1120-2 cause the bladder 175 to preferentially expand laterally inward as the bladder 175 is inflated. The reinforcing structures 1120-1, 1120-2 may have a similar composition as the reinforcing structure 710 discussed above with respect to FIG. 7. As shown in the cross-sectional views 1100, 1125, the reinforcing structures 1120-1, 1120-2 have an "L" shape. The increased rigidity provided by the reinforcing structures 1120-1, 1120-2 causes the bladder 175 to preferentially expand laterally inward into the inner recess 135 as the bladder 175 is inflated. In some embodiments, the reinforcing structures 1120-1, 1120-2 are part of a continuous reinforcing structure (e.g., having an annular profile from a bottom view, corresponding to an annular profile of the bladder 175). In other embodiments, the reinforcing structures 1120-1, 1120-2 may be independent of each other.

When the bladder 175 is in the uninflated state, the end effector presents a suction area corresponding to the diameter $d_2$. As the bladder 175 is inflated, the bladder 175 preferentially expands laterally inward due to the increased rigidity provided by the reinforcing structures 1120-1, 1120-2. As shown in the cross-sectional view 1125, when the bladder 175 is in the inflated state, the end effector presents a smaller suction area corresponding to a diameter $d_8$ that is less than the diameter $d_2$.

When the bladder 175 is in the inflated state, the pliable body member 125 is covered by the bladder 175 from a bottom view. In some cases, only the bladder 175 forms a seal with a contacting item when the bladder 175 is in the inflated state, and the pliable body member 125 and/or the bladder 175 form a seal with the contacting item when the bladder 175 is in the uninflated state.

Although discussed primarily in terms of a combination of the pliable body member 125 and the bladder 175, alternate implementations may use inflation of the bladder 175 to control a suction area of the end effector, independent of the pliable body member 125. Stated another way, the bladder 175 may be in an uninflated state (or in a first inflated state) to present a first suction area, and inflated to a second inflated state to present a second suction area smaller than the first suction area.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An end effector comprising:
   a pliable body member defining an inner recess and having a sealing surface at a distal end, wherein the sealing surface is configured to form a seal with items and defines a first suction area;
   an inflatable bladder configured to expand into the inner recess, wherein when the bladder is in an inflated state, the bladder defines a second suction area smaller than the first suction area; and
   a vacuum port in fluid communication with the inner recess.

2. The end effector of claim 1, further comprising:
   a compressed gas port in fluid communication with a chamber of the bladder; and
   a mounting plate to which the pliable body member and the bladder are mounted, the mounting plate defining:
      a first opening through which the vacuum port is in fluid communication with the inner recess; and
      a second opening laterally outward from the first opening, wherein the compressed gas port is in fluid communication with the chamber through the second opening.

3. The end effector of claim 2, wherein the mounting plate is one or both of deformable and pivotable.

4. The end effector of claim 3, wherein the mounting plate is configured to deform or pivot such that the end effector provides impactive gripping of an item in addition to astrictive gripping of the item provided via the vacuum port.

5. The end effector of claim 2, wherein the bladder comprises bellows.

6. The end effector of claim 2, wherein the bladder is further mounted to an inner wall of the pliable body member.

7. The end effector of claim 2, wherein the chamber and the inner recess are concentrically arranged.

8. The end effector of claim 2, further comprising:
   a controller operable to:
      apply, via the second opening, a compressed gas to the chamber to inflate the bladder to the inflated state; and
      apply, via the first opening, a suction force to the inner recess.

9. The end effector of claim 8, wherein the controller is further operable to:
   determine a target value for the second suction area,
   wherein applying the compressed gas to the chamber is based on the target value.

10. The end effector of claim 1, wherein the bladder comprises a plurality of bladder sections that are individually inflatable.

11. The end effector of claim 1, wherein the bladder comprises a reinforcing structure that controls a profile of an external surface of the bladder when in the inflated state.

12. The end effector of claim 11, wherein the reinforcing structure causes the bladder to preferentially expand laterally inward or distally as the bladder is inflated.

13. A method of suctioning an item using an end effector, the end effector comprising a pliable body member defining an inner recess and having a sealing surface at a distal end of the pliable body member, the method comprising:
   expanding a bladder into the inner recess, wherein the bladder defines a second suction area smaller than a first suction area defined by the sealing surface;
   contacting an item with the bladder while expanded; and
   maintaining a vacuum between the item and the bladder to retain the item.

14. The method of claim 13, further comprising:
   determining a target value for the second suction area, wherein expanding the bladder into the inner recess comprises:
      applying, based on the target value, a compressed gas to a chamber of the bladder.

15. The method of claim 13, further comprising:
   identifying, using imagery acquired by one or more visual sensors, a target contact region of the item; and
   determining, using the imagery, a geometry of the target contact region,
   wherein expanding the bladder into the inner recess is based on the geometry of the target contact region.

16. The method of claim 15, wherein the bladder comprises a plurality of bladder sections that are individually inflatable, wherein expanding the bladder into the inner recess comprises:
   selecting, based on the geometry of the target contact region, a set of one or more bladder sections of the plurality of bladder sections; and
   inflating the one or more bladder sections of the set.

17. The method of claim 13, wherein the end effector further comprises a mounting plate to which the pliable body member and the bladder are mounted, the method further comprising:
   applying one or more forces to deform or pivot the mounting plate, wherein deforming or pivoting the mounting plate alters a geometry of the sealing surface.

18. The method of claim 17, wherein the one or more forces are applied using one or more actuators coupled with one or more lateral portions of the mounting plate.

19. An end effector comprising:
   a pliable body member defining an inner recess;
   a bladder disposed at least partially within the inner recess; and
   a vacuum port in fluid communication with the inner recess,
   wherein, when the bladder is in an unexpanded state, the end effector is configured to form a seal with items contacting a distal end of the pliable body member, and
   wherein, when the bladder is in an expanded state, the end effector is configured to form a seal with items contacting a distal end of the bladder.

20. The end effector of claim 19, further comprising:
   a compressed gas port in fluid communication with a chamber of the bladder; and
   a mounting plate to which the pliable body member and the bladder are mounted, the mounting plate defining:
      a first opening through which the vacuum port is in fluid communication with the inner recess; and
      a second opening laterally outward from the first opening, wherein the compressed gas port is in fluid communication with the chamber through the second opening.

21. The end effector of claim 19, wherein the bladder comprises a plurality of bladder sections that are individually inflatable.

22. The end effector of claim 19, wherein the bladder comprises a reinforcing structure that controls a profile of an external surface of the bladder when in the expanded state.

23. The end effector of claim 22, wherein the reinforcing structure causes the bladder to preferentially expand laterally inward or distally as the bladder is expanded.

* * * * *